April 24, 1962 P. G. S. MERO 3,031,209

RECORDING DEVICES

Filed June 23, 1959 2 Sheets-Sheet 1

INVENTOR.

PETER G. S. MERO

BY Thomas E. Dorn

ATTY.

April 24, 1962 P. G. S. MERO 3,031,209

RECORDING DEVICES

Filed June 23, 1959 2 Sheets-Sheet 2

INVENTOR.
PETER G. S. MERO
BY Thomas E. Dorn
Att'y.

United States Patent Office 3,031,209
Patented Apr. 24, 1962

3,031,209

RECORDING DEVICES

Peter G. S. Mero, 830 Mount Pleasant, Winnetka, Ill.

Filed June 23, 1959, Ser. No. 822,236
3 Claims. (Cl. 281—11)

This invention relates to record communication systems and particularly to devices for controlling the feeding of a web of paper or other recording medium in a graphic communication system of the kind in which data is transcribed manually at one station and is automatically reproduced at another station.

In a graphic communication system, a message or other data, such as a sketch, is written or drawn by hand upon a sheet of paper or the like at the transmitter, using a stylus which may resemble a pen or pencil insofar as size and shape are concerned. The stylus is connected to a translating apparatus which develops electrical control signals representative of the movements of the stylus. For example, the translating apparatus may be of the kind described in Patent No. 2,583,535 of Robert Adler, issued January 29, 1952, and in Patent No. 2,649,503 of Robert Adler, issued August 18, 1953. At the receiver of the system, the signals are used to control movements of another stylus, relative to a recording medium, to reproduce the same data as is transcribed manually at the transmitter.

In a system of this kind, it is necessary to replace the recording medium quite frequently, at both the transmitter and the receiver, in order to afford space for additional messages. The change of recording medium should be accomplished relatively rapidly, in order to avoid unduly restricting the amount of data which may be transmitted. On the other hand, the paper or other recording medium should be held almost completely flat on a writing surface in order to avoid interfering with the operation of either the transmitter or receiver stylus. Buckling, wrinkling, or twisting of the paper is highly undesirable, particularly because the stylus coupling linkages in systems of this kind are frequently made light in weight to minimize inertia effects and to permit convenient and accurate reproduction at both the transmitter and receiver.

It is a principal object of the invention, therefore, to feed a paper web, in either the transmitter or receiver of a graphic recording system, rapidly and accurately, while maintaining the web in full surface contact with a platen or the like.

It is a further object of the invention to provide automatic compensation, in the paper feed of a graphic communication transmitter or receiver, for minor variations in the paper stock and also for minor dimensional or alignment variations in the paper feed apparatus itself.

A particular object of the invention is to provide a simple and economical paper alignment compensator, in the paper feed of a record communication device, which maintains the paper web under tension at all times, yet is effective to compensate for manufacturing and alignment discrepancies in the paper feed apparatus and in the paper itself.

A specific object of the invention is to compensate for changes and variations in feed apertures in a sprocket-fed paper web used in a graphic communication system.

A further object of the invention is to afford a new and improved sprocket structure and feed roll for the paper feed of a graphic communication system which is light in weight yet easily held to relatively close manufacturing tolerances.

Another object of the invention is to afford a feeding system for a web of paper or other recording medium, in a graphic communication system, which maintains the paper in flat full surface contact with a platen or other writing surface at all times.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

Figure 1:
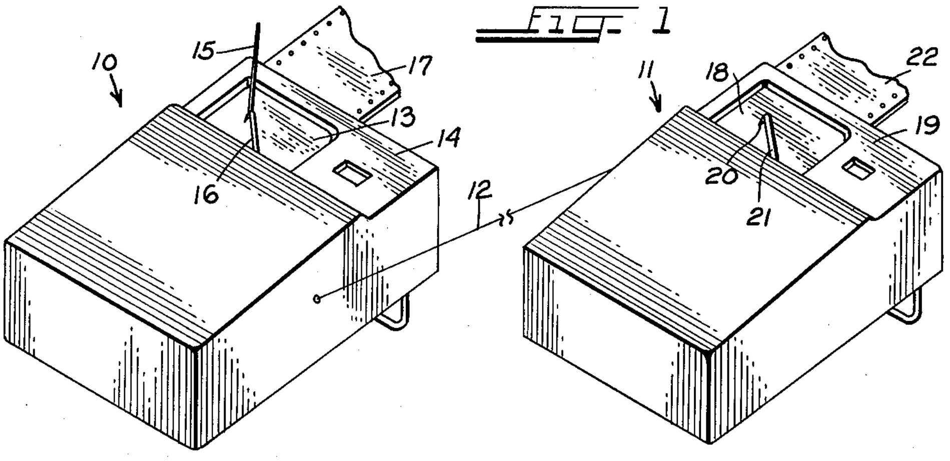
FIG. 1 is a simplified perspective view of a graphic communication system, and shows two communications system stations in which the present invention may be incorporated.

The graphic communication system illustrated in FIG. 1 comprises two communication stations 10 and 11 which are electrically connected or otherwise coupled to each other as by a transmission line 12. It should be understood that a radio transmission link or other coupling arrangement may be substituted for the transmission line. The station 10, in the illustrated system, is a transmitter, whereas the station 11 is a receiver.

The transmitter 10 includes a writing surface 13 which is bounded by a portion of the cabinet 14 of the communication station. A suitable recording medium 17, usually paper, may be disposed upon a writing surface 13. The station 10 further includes a writing instrument comprising a stylus or pen 15 which is supported upon an arm or link 16. The support link 16 constitutes a part of the transmitter apparatus and may comprise one member of a parallel linkage system in a translating apparatus of the kind described in the aforementioned Patent No. 2,583,535 of Robert Adler.

The receiver 11 is, in many respects, essentially similar in construction to station 10, and includes a writing surface 18 bounded by a part of the cabinet 19 of the station. As in the case of the transmitter 10, the writing surface 18 may be utilized to support a suitable recording medium 22 in position to be engaged by a writing head or stylus 20. The stylus 20 is mounted upon a support arm or link 21 which comprises one member of a translating mechanism similar to that utilized at the transmitter 10. The transmitter unit 10 further includes suitable electrical circuits for translating movements of the stylus or pen 15 into electrical control signals which are transmitted over the line 12 or other coupling link to the receiver 11. The receiver 11, on the other hand, includes suitable circuits and devices for moving the stylus 20 into and out of engagement with the recording medium 22 on the writing surface 18 and for moving the stylus 20 transversely of the writing surface to reproduce information thereon in response to the control signals transmitted from the transmitter 10. The electrical circuits and signal-transmitting devices for the transmitter and receiver may be of known construction, particularly as described in the aforementioned Adler patents, and therefore need not be set forth specifically herein.

The self-compensating paper feed mechanism illustrated in FIGS. 2–5 comprises a main frame 31 which, in a typical communication system station such as either of the units 10 and 11, may form the main vertical support member for the paper feed system and appurtenant devices. The main frame 31 is provided with a horizontal extension portion 32 upon which a platen 33 is mounted (see FIGS. 2 and 4). Preferably, the main frame 31 and the platen support extension 32 are formed as an integral unit; for example, these members may comprise a single die cast aluminum structure. On the other hand, if desired, the extension portion 32 upon which the platen 33 is mounted may be fabricated as a separate member and may be bolted, welded, or otherwise secured to the main frame 31.

In the illustrated embodiment, three threaded studs 34, 35 and 36 are mounted in the platen support frame member 32 and project upwardly thereof. The studs 34–36 may be affixed to the frame member 32 in any desired manner; in the illustrated embodiment, the studs are threaded into suitable tapped openings in the frame member and are provided with suitable locking nuts to hold them in position on the frame member. The platen 33, on the other hand, is provided with a corresponding plurality of bifurcated mounting projections 44, 45 and 46. The mounting extensions 44, 45 and 46 are located on the platen in positions such that they may engage the three studs 34, 35 and 36, respectively, and thus locate the platen in a predetermined position upon the platen support member 32. The bifurcated mounting extension 44 of the platen 33 engages in a groove in a nylon mounting sleeve 41 which, in turn, is threaded onto the mounting stud 34. Similar mounting sleeves 42 and 43 are utilized in mounting the platen upon the studs 35 and 36, respectively. It is the upper surface of the platen 33 which defines the writing surface for the communication system, thus corresponding to either writing surface 13 at the transmitter 10 or writing surface 18 at the receiver 11 (FIG. 1). In the description of the invention set forth hereinafter, it is assumed that the mechanism shown is incorporated in the transmitter 10, but the paper feed system could be utilized to equal advantage in the receiver 11.

Figures 2, 3:
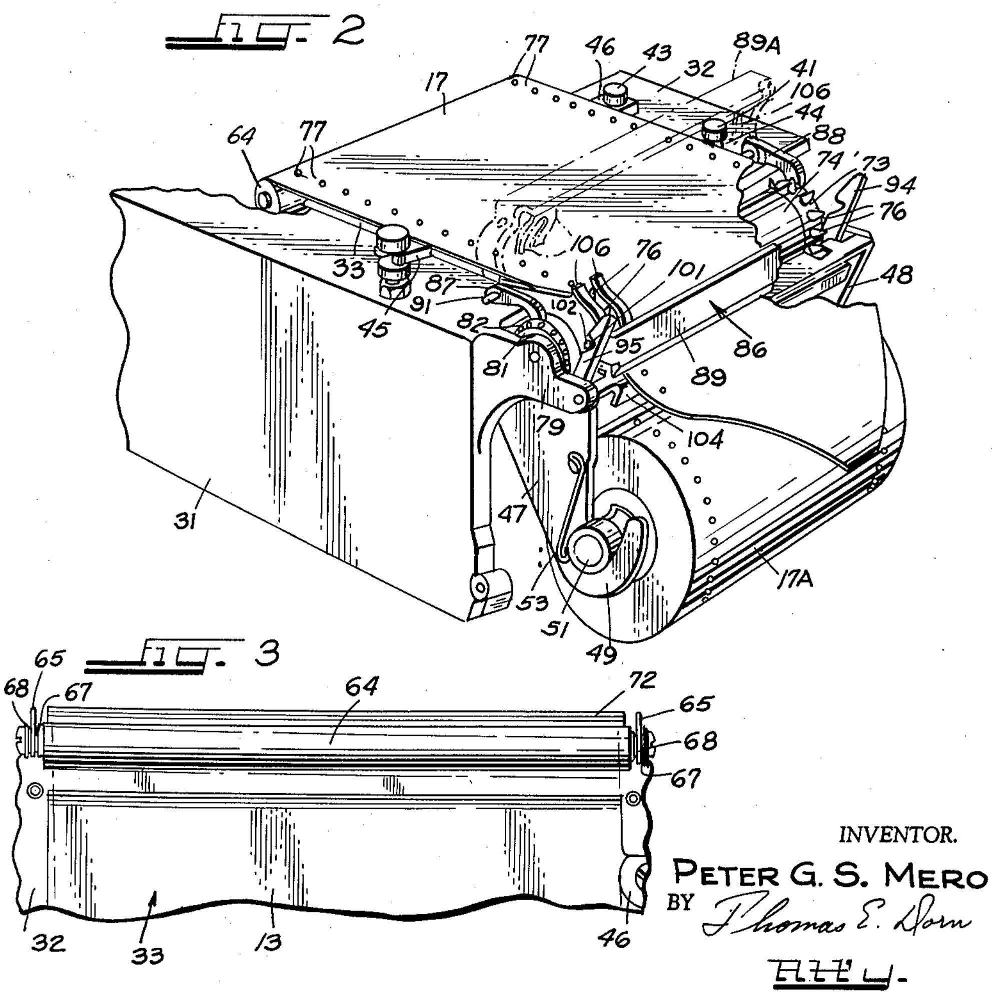
FIG. 2 is a perspective view of a paper mechanism constructed in accordance with one embodiment of the invention.
FIG. 3 is a partial plan view of the paper feed mechanism of FIG. 2.
Figure 4:
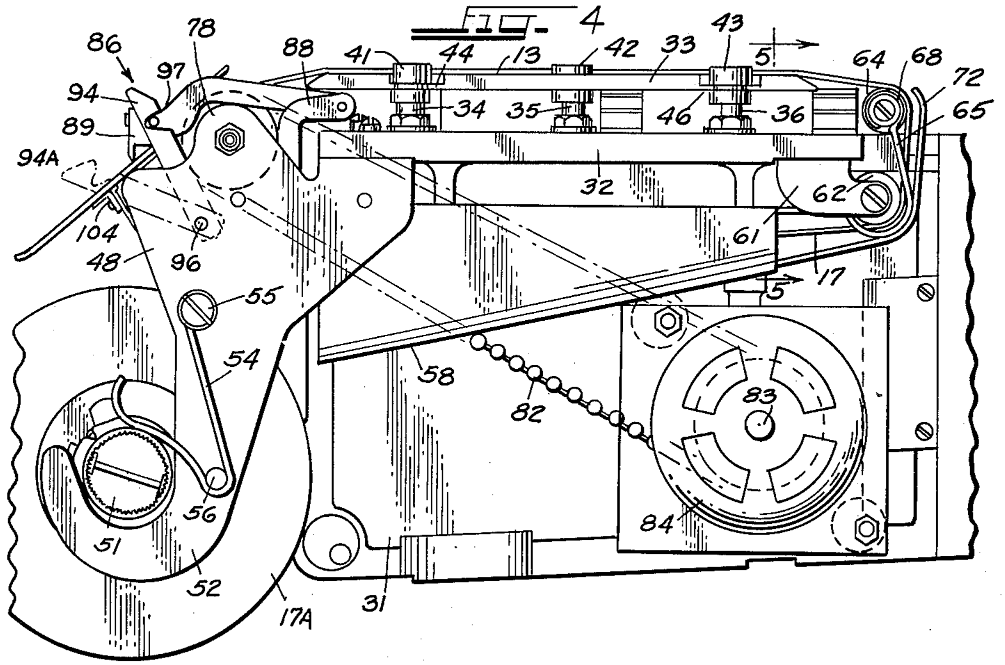
FIG. 4 is an elevation view, partly cut way, of the paper feed mechanism.

The paper feed mechanism of the invention, in the illustrated embodiment, includes a pair of brackets 47 and 48 which are affixed to the platen support member 32 at opposite sides of the assembly, as best seen in FIG. 2. At its lower end, the bracket 47 is provided with a hook-shaped extension 49, with bracket 48 being provided with a similar hook-shaped extension 52 (see FIGS. 2 and 4). A spindle 51 is mounted in the bracket extensions 49 and 52 and is held in its mounted position by means of a pair of retainer springs 53 and 54 which are mounted on the brackets 47 and 48 respectively. As best shown in FIG. 4, one end of the spring 54 is mounted on the bracket 48 by suitable means such as a mounting screw 55. The spring extends around a rivet or other retainer member 56 and into engagement with one end of the spindle 51. The two springs 53 and 54, in addition to maintaining the spindle 51 in mounted position on the two brackets, serve to apply a frictional drag to the spindle and thus assist in maintaining the paper or other record medium 17 under tension, as explained in greater detail hereinafter.

In the illustrated embodiment, a chute or paper guide 58 is mounted on the platen support member 32, on the lower side thereof. A paper roll 17A is mounted upon the spindle 51 and is extended therefrom through the chute 58. The spindle 51 is preferably provided with suitable means, such as one or more spring members, for preventing relative rotational movement between the paper roll 17A and the spindle. Inasmuch as devices of this kind are well known, there is no need to set forth this particular part of the structure in detail.

Figure 6:
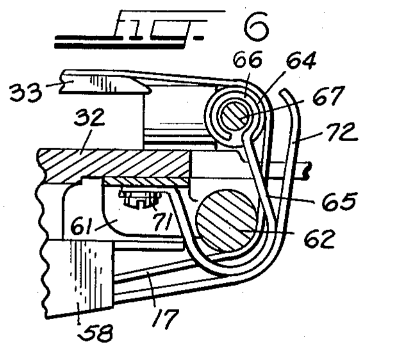
FIG. 6 is a detail sectional view taken approximately as indicated by line 6—6 in FIG. 5.

A pair of relatively small mounting brackets 61 are mounted on the lower side of the platen support member 32 at the end thereof opposite the brackets 47 and 48 (see FIGS. 4 and 6). A guide roll 62 is supported by and extends between the two brackets 61. The guide roll 62 may be journalled in the two brackets, if desired; however, this is not necessary and the roll may be fixedly secured to the brackets. Moreover, it is not necessary that a roller be utilized in this portion of the mechanism; instead, a sheet metal guide may be substituted for the roller 62 or, in some instances, the guide roll may be eliminated entirely, depending upon the direction and angle at which the paper web 17 is directed to the platen 33.

Figure 5:
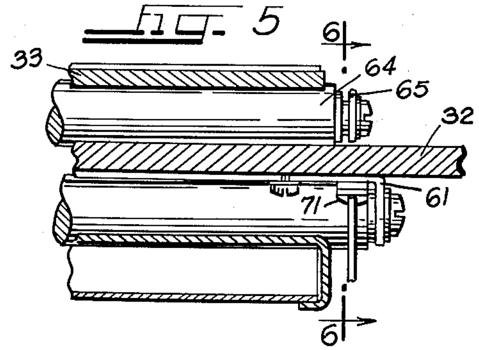
FIG. 5 is a detail sectional view taken approximately along line 5—5 in FIG. 4.

Immediately above the fixed guide roll 62, there is provided a floating roll 64 which is effective to compensate for any angular misalignment of any part of the paper feed system relative to the writing surface 13 of the platen 33. The compensating roll 64 is not mounted in fixed position, but rather is supported by means which permit limited movement of the roll in virtually any direction. The preferred mounting arrangement is best shown in FIGS. 4–6. As indicated therein, the paper compensator roll 64 is supported at its opposite ends by means of a pair of substantially U-shaped wire springs 65, which comprise mounting brackets for the roll. By reference to FIG. 6, it is seen that the upper end of each spring 65 is provided with a hook-shaped portion 66 which engages a reduced-diameter extension portion 67 of the floating roll 64. Essentially the same construction is shown in FIG. 4. Moreover, and as shown in FIG. 4, retainer devices such as the retainer washer or similar member 68 may be utilized to maintain the roll 64 in mounted position on the two springs 65.

The end of each of the springs 65 opposite the floating roll 64 is bent in a manner such that the main portion of the spring is of substantially U-shaped configuration. As illustrated in FIG. 6, each of the springs 65 is secured to the platen support member 32 by suitable mounting means such as the screws 71. An extension 72 of the paper chute 58 projects around the two rolls 62 and 64 and serves as a guide for the paper web 17 (FIGS. 3 and 4). Thus, the paper web 17 is extended around the two rolls 62 and 64, between the rolls and the guide extension 72, and across the writing surface 13 of the platen 33.

Figure 7:
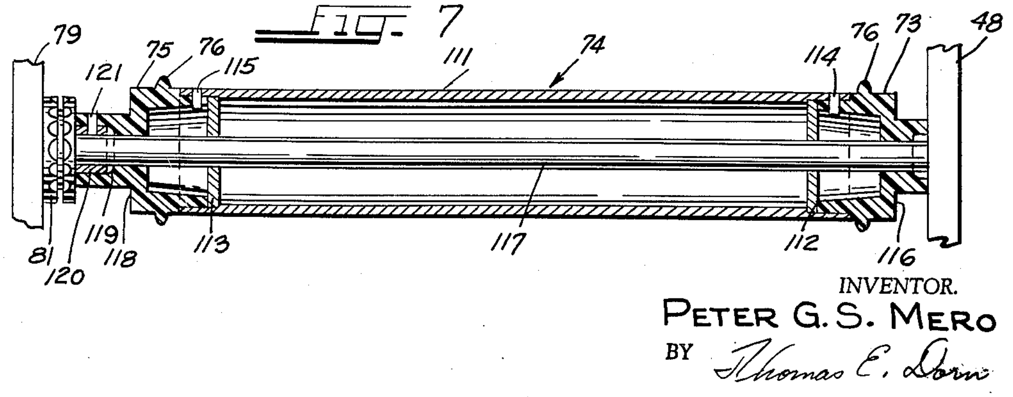
FIG. 7 is a detail sectional view of a paper feed roll utilized in the preferred form of the invention.

At the end of the paper feed mechanism opposite the compensator roll 64, there is located a paper feed roll 74 (see FIG. 2). The paper feed roll 74 is provided, at its opposite ends, with a pair of feed sprockets 73 and 75 each having a plurality of teeth 76 for engaging in suitable perforations 77 in the paper web 17. One end of the paper feed roll 74 is journalled in a portion 78 of the bracket 48, as shown in FIGS. 4 and 7. At the opposite end, the feed roll is provided with an extension portion which is journalled in a lug or projection 79 which comprises an integral part of the main frame member 31 (see FIGS. 2 and 7). A sprocket 81 is mounted upon the portion of the feed roll 74 adjacent the mounting lug 79 and a drive chain 82 is engaged with this sprocket and with a suitable drive sprocket mounted upon the shaft 83 of a drive motor 84 (FIG. 4).

The construction of the paper feed roll 74 is shown in detail in the sectional view of FIG. 7. As shown therein, in the preferred construction the paper feed roll comprises a relatively thin metal cylinder 111 of uniform external diameter, the internal diameter of the cylinder being slightly enlarged in the sections 112 and 113. The sprocket 73 is fabricated from a suitable plastic, such as nylon, and is force-fit into the enlarged-diameter section 112 of the cylinder 111. That is, the sprocket 73 is pressed into the cylinder. In addition, one or more relatively small pins 114 may be utilized to lock the sprocket in position in the cylinder and to prevent relative rotation between these parts. The other sprocket 75 is similarly pressed into the enlarged-diameter section 113 of the cylinder 111, and may be locked in position therein by suitable means such as the pin 115.

The sprocket 73 is provided with a bearing portion 116 which engages a shaft 117 that extends axially through the paper feed roll. The sprocket 75 is provided with a similar bearing portion 118 which engages the opposite end of the shaft 117. In addition, the outboard portion of the sprocket 75 is provided with an opening 119 into which a hub 120 on the sprocket 81 is force-fit. It should be noted that the hub 120 of the sprocket 81 is preferably constructed with an internal diameter substantially larger than the external diameter of the shaft 117, so that there is no metal-to-metal contact between these parts. Thus, the illustrated construction takes advantage of the substantially self-lubricating qualities of the plastic spindles 73 and 75, when utilized as bearings engaging the shaft 117, and thereby effectively minimizing the problem of lubrication of these bearings. Preferably, a pin 121 or other suitable means is utilized to prevent relative rotation between the sprocket 81 and the sprocket 75. In the illustrated embodiment, construction for the paper feed roll is extremely light in weight, and is relatively inexpensive; on the other hand, it permits fabrication of this element to relatively close tolerances and makes possible accurately controlled feeding of the paper web 17, as described hereinafter.

A guide and stripper device 86 is included in the paper feed system and is associated with the paper feed roll 74. The guide and stripper device includes a pair of mounting brackets 87 and 88 which are located at opposite sides of the mechanism and may be mounted upon the brackets 47 and 48, respectively. A paper stripper bar 89 is pivotally mounted on a pivot rod or shaft 91 which is supported by and extends between the two brackets 87 and 88. The stripper bar 89 is pivotally movable between a normal operating position shown in solid lines in FIGS. 2 and 4 and an elevated or paper loading position illustrated by the phantom outline 89A in FIG. 2. A suitable torsion spring or other biasing spring (not shown) may be employed to urge the stripper bar toward the elevated or paper feeding position 89A.

The guide and stripper device 86 further includes a latching device which is utilized to retain the stripper bar 89 in its operating position during normal operation of the system. The latching device comprises a pair of latch members 94 and 95 which comprise the legs of a single substantially U-shaped latch element which extends across the paper outlet end of the paper feed mechanism, the latch members being pivotally mounted upon a mounting shaft or pin 96 (see FIG. 4). The latch member 94 is provided with a notch 97 which engages a projecting latch pin 98 on the end of the stripper bar 89. The latch member 95 is provided with a similar notch 101 which engages a projecting latch pin 102 affixed to the opposite end of the stripper bar. Thus, with the latch members 94 and 95 in their normal operating position, as shown in FIGS. 2 and 4, the latch elements serve to retain the stripper bar 89 in its normal operating position. However, the latch elements may be pivoted relative to the mounting shaft 96 as indicated by the dash outline 94A in FIG. 4 to release them from latching engagement with the stripper bar projections 98 and 102 and permit the stripper bar to pivot to its elevated or paper loading position 89A (see FIG. 2). A suitable torsion spring or other biasing member may be utilized to maintain the latch assembly comprising the latching elements 94 and 95 in latching position if desired.

The guide and stripper device 86 also includes a stripper anvil 104 which is located beneath the stripper bar 89. The paper web 17 is fed between the stripper bar 89 and the anvil 104, as shown in FIGS. 2 and 4, and guides the paper as it is fed outwardly of the paper feed mechanism. Suitable guide fingers 106 may be mounted upon the stripper bar 89 and may be utilized to maintain the paper web 17 in engagement with the feed roll 74 and the feed sprocket teeth 76.

To load the paper feed mechanism, a roll of paper or other recording medium, such as the roll 17A, is mounted on the spindle 51, which is then mounted in the brackets 47, 48. The paper is pulled through the chute 58, over the guide 62, over the floating roll 64, and across the platen 33. The paper guide and stripper is moved out of the way and the feed apertures 77 are aligned with the sprockets 73 and 75. The paper is engaged with the sprockets while being held under a slight tension, the spring mounting for the compensating roll 64 taking up any slack when the tension on the paper is released. In fact, the roll 64 and its resilient mounting maintain the paper under tension and assure full surface contact with the platen 33.

If there is any minor error in registration between the apertures 77 on the opposite sides of the paper web, there is a tendency for the paper to become skewed or twisted and thus to be loose at one side or the other of the platen. The compensating roll 64 automatically compensates for any such discrepancy, however, since the resilient mounting for this roll permits limited movement in virtually any direction relative to the platen. The same tendency toward skewing of the paper may arise from misalignment of the teeth 76 on the two sprockets, relative to each other or to the apertures 77, but is equally well compensated by the compensating roll 64. Thus, the compensating roll substantially reduces the requirements for precision in manufacture of the sprocket assembly or paper feed roll 74 as well as the paper web 17. The compensating roll holds the paper in full surface contact with the platen surface, prevents buckling, wrinkling, or twisting of the paper, and thus materially assists the accurate and effective operation of the graphic recording transmitter or receiver in which it is incorporated.

When the paper web 17 is to be advanced, the motor 84 is energized, driving the paper feed roll 74 through the drive chain 82. Rotation of the feed roll 74 advances the paper web, placing a fresh section thereof on the platen 33 for recording of additional data. The expended portion of the web may be cut off by pulling it upwardly against the stripper bar 89. The stripper bar is maintained in its latched-down position during normal operation of the recording unit, and is usually raised to position 89A only when a new supply of paper or other recording medium is inserted in the recorder. The light weight of the paper feed roll 74 facilitates rapid movement of the paper web and reduces the load on the motor 84 somewhat. The plastic sprocket members afford substantially self-lubricating bearings and are quite economical to manufacture, as compared with metal sprockets made to comparable close tolerances.

Hence, while I have illustrated and described the preferred embodiments of my invention, it is to be understood that these are capable of variation and modification.

I claim:

1. A paper feed apparatus for a graphic communication system of the kind in which data is recorded by a stylus moving across a portion of a web of paper or other recording medium supported upon a platen, said feed apparatus comprising: paper feed means, located adjacent one end of the platen, for pulling a web of paper or other recording medium across the platen and for holding the web in fixed longitudinal position relative to the platen; a guide member, located adjacent the opposite end of the platen, over which the web is passed, said web extending from said guide member to said paper feed means; and compensating means for maintaining said web under tension and in full surface contact with said platen despite dimensional irregularities and alignment variations in said web and said paper feed means, said compensating means comprising two independent resilient cantilever support members supporting opposite ends of said guide member and allowing independent omnidirectional pivotal movement of each end of the guide member relative to the other end thereof and relative to the platen, and further permitting limited omnidirectional translational movement of said guide member relative to said platen.

2. A paper feed apparatus for a graphic communication system of the kind in which data is recorded by a stylus moving across a portion of a web of paper or other recording medium supported upon a platen, said feed apparatus comprising: paper feed means, located adjacent one end of the platen, for pulling a web of paper or other recording medium across the platen and for holding the web in fixed longitudinal position relative to the platen; a guide roll, located adjacent the opposite end of the platen, over which the web is passed, said web extending from said guide roll to said paper feed means; and compensating means for maintaining said web under tension and in full surface contact with said platen despite dimensional irregularities and alignment variations in said web and said paper feed means, said compensating means comprising two independent cantilever spring wire support members bent to afford individual mounting brackets supporting opposite ends of said guide roll and allowing independent omnidirectional pivotal movement of each end of the guide roll relative to the other end thereof and relative to the platen, and further permitting limited omnidirectional translational movement of said guide roll relative to said platen.

3. A paper feed apparatus for a graphic communication system of the kind in which data is recorded by a stylus moving across a portion of a web of paper or other recording medium supported upon a platen, said web having spaced web feeding perforations longitudinally thereof, said feed apparatus comprising: paper feed means, located adjacent one end of the platen, for engaging in said perforations and pulling a web of paper or other recording medium across the platen and for holding the web in fixed longitudinal position relative to the platen; a guide roll, located adjacent the opposite end of the platen, over which the web is passed, said web extending from said guide roll to said paper feed means; and compensating means for maintaining said web under tension and in full surface contact with said platen despite dimensional irregularities and alignment variations in said web and said paper feed means, said compensating means comprising a pair of independent U-shaped resilient cantilever support members supporting opposite ends of said guide roll and allowing independent omnidirectional pivotal movement of each end of the guide roll relative to the other end thereof and relative to the platen, and further permitting limited omnidirectional translational movement of said guide roll relative to said platen.

References Cited in the file of this patent

UNITED STATES PATENTS

| | | |
|---|---|---|
| 1,595,471 | Konerman et al. | Aug. 10, 1926 |
| 1,626,574 | Jackson | Apr. 26, 1927 |
| 1,649,234 | Johnson | Nov. 15, 1927 |
| 2,346,163 | Hiles | Apr. 11, 1944 |